(12) United States Patent
Rake et al.

(10) Patent No.: US 8,438,987 B2
(45) Date of Patent: May 14, 2013

(54) OPERATING DEVICE HAVING A BUNDLE OF LIGHT GUIDES

(75) Inventors: Ludger Rake, Diepholz (DE); Andreas Giefer, Lemförde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 332 days.

(21) Appl. No.: 12/993,430

(22) PCT Filed: Apr. 8, 2009

(86) PCT No.: PCT/DE2009/050021
§ 371 (c)(1),
(2), (4) Date: Nov. 18, 2010

(87) PCT Pub. No.: WO2009/140959
PCT Pub. Date: Nov. 26, 2009

(65) Prior Publication Data
US 2011/0067515 A1 Mar. 24, 2011

(30) Foreign Application Priority Data
May 20, 2008 (DE) .......................... 10 2008 001 884

(51) Int. Cl.
*F16H 63/42* (2006.01)
*F16H 59/08* (2006.01)

(52) U.S. Cl.
USPC ................................... 116/28.1; 116/DIG. 20

(58) Field of Classification Search ................. 116/28.1, 116/DIG. 5, DIG. 20; 340/456
See application file for complete search history.

(56) References Cited

U.S. PATENT DOCUMENTS

| 3,677,619 | A | * | 7/1972 | Mackenzie | 359/436 |
| 3,868,923 | A | * | 3/1975 | Lambiris | 116/28.1 |
| 4,139,949 | A | * | 2/1979 | Goldman | 33/348 |
| 4,800,466 | A | | 1/1989 | Bauer et al. | |
| 4,896,135 | A | * | 1/1990 | Deeds et al. | 340/456 |
| 5,161,422 | A | * | 11/1992 | Suman et al. | 74/335 |
| 5,512,875 | A | * | 4/1996 | Polityka | 340/456 |

(Continued)

FOREIGN PATENT DOCUMENTS
DE 35 35 881 A1 4/1987
DE 89 02 383 U1 4/1989
(Continued)

OTHER PUBLICATIONS

Non-English International Search Report dated Jul. 14, 2009.

*Primary Examiner* — Richard A Smith
(74) *Attorney, Agent, or Firm* — Norris McLaughlin & Marcus, P.A.

(57) ABSTRACT

An operating device for selecting shift positions of a gear-changing transmission, for example an automatic transmission. The operating device comprises a shift operating device and a console arrangement with an operating lever and a shift position indicator device with illuminatable shift position designations. The shift position indicator device includes an electronics unit and a light-emitting device. The electronics unit and the light-emitting device are integrated into the shift operating unit. An ordered fiber-optic bundle for the selective illumination of shift position designations is disposed between the light-emitting device and shift position indicator device. The operating device enables cost savings in production and assembly by eliminating, for example, the electronic module in the region of the shift gate. Flexible, selective illumination of the illuminated symbols or shift position designations in the region of the shift gate becomes possible.

8 Claims, 3 Drawing Sheets

U.S. PATENT DOCUMENTS

| | | | |
|---|---|---|---|
| 6,173,622 B1 * | 1/2001 | Carnevale et al. | 74/335 |
| 6,564,661 B2 * | 5/2003 | DeJonge | 74/335 |
| 6,812,415 B1 | 11/2004 | Priesemuth | |
| 6,931,961 B2 | 8/2005 | Bauer et al. | |
| 7,441,474 B2 * | 10/2008 | Kliemannel et al. | 74/335 |
| 2002/0134186 A1 | 9/2002 | Bauer et al. | |

FOREIGN PATENT DOCUMENTS

| | | |
|---|---|---|
| DE | 40 03 281 A1 | 8/1991 |
| DE | 42 28 982 C1 | 9/1993 |
| DE | 197 56 052 A1 | 7/1999 |
| DE | 101 13 534 B4 | 2/2002 |

* cited by examiner

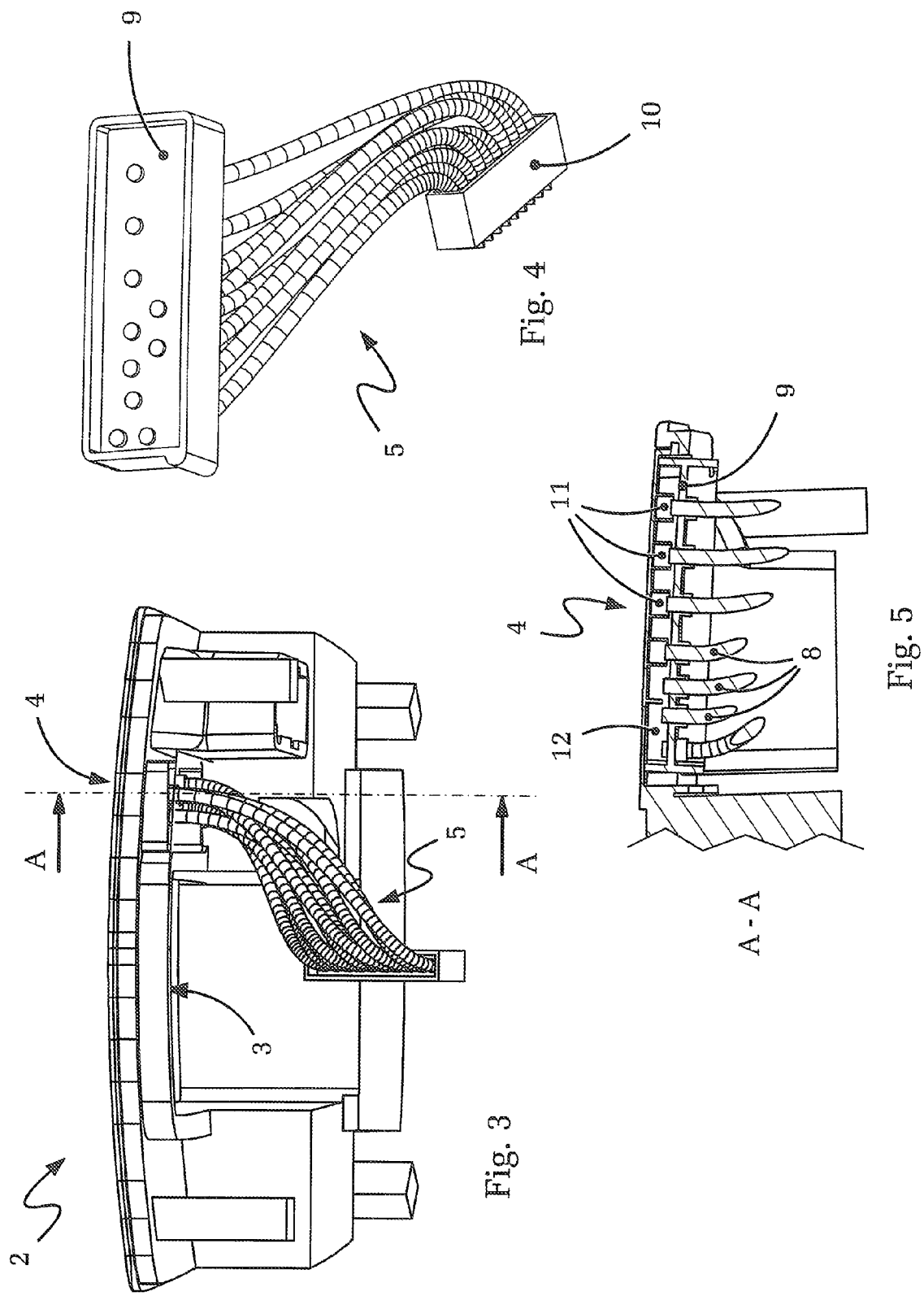

OPERATING DEVICE HAVING A BUNDLE OF LIGHT GUIDES

This is an application filed under 35 USC §371 of PCT/DE2009/050021, claiming priority to DE 10 2008 001 884.8 filed on May 20, 2008.

BACKGROUND OF THE INVENTION (1) Field of the Invention

The invention relates to an operating device, in particular for a gear-changing transmission, for example an automatic transmission, according to the preamble of claim 1.

Gear-changing transmissions of automobiles are typically shifted or controlled with an operating device arranged within reach of the driver. Typically, operating elements, such as shift levers or selection levers, are used which are arranged, for example, between the front seats of the automobile or in other areas of the cockpit.

For visually identifying the instantaneous engaged position of the operating element or the instantaneous engaged gear in a gear-changing transmission, generic operating devices frequently include a gear or shift position indicator device with illuminated symbols or shift position designations. The shift position indicator device is primarily arranged in the area of the operating element or the shift gate and includes a number of illuminated symbols or shift position designations which can be individually illuminated depending on the selected or engaged shift position.

(2) Description of Related Art

DE 40 03 281 A1 discloses a device for indicating the engaged shift position, wherein the shift position designation corresponding to the respective engaged shift position is illuminated through a slit aperture rotatable about a light source and light arms constructed as an injection molded part. However, this device is mechanically complex and includes a number of individual parts, resulting in significant manufacturing and installation costs. On the other hand, a not insignificant amount of installation space is required in the region of the operating device for controlling the shift position indicating device. This conventional shift position indicator device is also relatively inflexible with respect to a possible variation in the arrangement of the shift gate and the shift position designations.

Operating devices known in the art with shift position illumination use separate electric illumination devices arranged in the region of the shift gate or in the region of the shift position designations to be illuminated, for example a circuit board with control electronics and light-emitting diodes for direct illumination of the shift position designations.

However, these separate illumination devices or LED circuit boards are also comparably complex and hence expensive, in particular because such circuit boards must be provided and installed in the shift operating unit in addition to the already existing control board and cabled with the control board.

DE 101 13 534 B4 also shows an operating device for selecting shift positions of a gear-changing transmission with a selection lever that protrudes through a cover. A shift position indicator device is also housed in the cover. Light-emitting diodes which transmit the emitted light to the elements of the shift gate symbols through the cylindrical optical fibers arranged in the housing are arranged on a circuit board disposed in a housing. Additional light wells are arranged between the cylindrical optical fibers in the housing and the shift gate symbols provided in the cover for bridging the distance between the housing and the cover and for transmitting the light onward. This arrangement has the disadvantage that due to the fixed, rigid and the straight association of the shift gate symbols with the diodes on the circuit board, the positions of the diodes on the circuit board are inflexibly defined. The shifting pattern for the circuit board and/or its design is therefore strictly regulated and defined in advance.

With this background, it is an object of the present invention to provide an operating device with an illuminatable shift position indicator device, in particular for a gear-changing transmission, capable of eliminating the aforementioned disadvantages of the state of the art. In particular, the operating device to be able to be produced at low cost and allow flexible installation and simultaneously reliably accentuate and illuminate the individual illuminated symbols and shift position designations in the region of the shift gate.

BRIEF SUMMARY OF THE INVENTION

This object is attained with an operating device having the features of claim 1. Advantageous embodiments are recited in the dependent claims.

In a primarily conventional manner, the operating device according to the present invention includes a shift operating device and a console arrangement with a mechanical operating element extending through the console arrangement, for example an operating lever. In a likewise conventional manner, the operating device also includes a shift position indicator device arranged in the console arrangement with illuminatable shift position designations or illuminated symbols. The shift position indicator device includes an electronics unit with a light-emitting device.

According to the invention, the operating device is characterized in that the electronics unit and the light-emitting device are integrated in the shift operating unit, wherein an ordered fiber-optic bundle formed of elastic optical fibers is arranged between the light-emitting device and the shift position indicator device for selective illumination of shift position designations and the illuminated symbols, respectively.

The term "ordered" in relation to the fiber-optic bundle is used to indicate that the positions of optical fiber ends or area regions at the light entrance and the light exit of the fiber-optic bundles always have a fixed relationship with respect to each other, meaning that when a certain light entrance area of the ordered fiber-optic bundle is illuminated, a corresponding light exit area of the fiber-optic bundle is illuminated. This differentiates an ordered fiber-optic bundle from a random fiber-optic bundle, because with a random fiber-optic bundle (for example glass fiber bundles used for general illumination purposes), the location of the exiting light is not fixedly associated with the location of the entering light, but is only randomly associated due to the random course of the fibers.

With this feature of the invention, the additional circuit board with control electronics required in the state-of-the-art for the light-emitting diodes arranged, for example, in the region of the shift position indicator device, as well as fiber-optic elements arranged on the light-emitting diodes and the corresponding cabling with the electronics of the shift operating unit can advantageously be eliminated. Instead, it now becomes possible with the invention to combine both the control electronics and the illuminating means or light-emitting diodes with the electronics of the shift operating device or to optionally place them on a single control board. With the invention, the separate and generally expensive circuit board in the region of the shift position indicator device can be eliminated.

Instead, the operating device according to the invention includes an ordered fiber-optic bundle formed of elastic optical fibers and arranged between the light-emitting device, for example an arrangement of light-emitting diodes, disposed on a circuit board in the shift operating device and the actual shift position indicator device in the region of the shift gate. The ordered fiber-optic bundle formed of elastic optical fibers then provides a simple connection between the light-emitting device having a plurality of illuminating means or light-emitting diodes and the shift position indicator device, which also has a plurality of shift position designations and/or illuminated symbols, so that the corresponding illumination means or the associated light-emitting diode is unambiguously optically associated with each shift position designation or each illuminated symbol.

The invention can be implemented independent of the design and construction of the fiber-optic bundle, as long as the fiber-optic bundle has an ordered structure. According to preferred embodiments of the invention, the fiber-optic bundle is formed from preferably elastic, macroscopic plastic optical fibers. The elastic plastic optical fibers which, unlikely the mostly microscopically fine glass fibers, have comparatively large diameters have the added advantage, in addition to their low costs, that preferably a single optical fiber is sufficient to optically connect a respective shift position designation or a respective illuminated symbol in the shift position indicator device with the associated light source or light-emitting diode in the shift position operating unit. In this embodiment, the number of required optical fibers is therefore preferably not greater than the shift position designations or illuminated symbols to be illuminated. However, for illuminating any illuminated symbols with a larger area in the region of the shift position indicator device, more than one optical fiber may be used, optionally also a single optical fiber with a correspondingly enlarged light exit face. The elastic construction of the fiber-optic bundle compared to a rigid structure—for example an injection molded part—has the advantage of easier installation as well as the possibility to position and install the shift lever indicator device in different relative positions to the shift operating device—for example with a different assembly embodiments.

According to another preferred embodiment of the invention, each of the ends of the optical fiber of the fiber optic bundle is received in a common bundle adapter. This makes handling of the fiber-optic bundle particularly simple since it is now embodied as a single assembly. Preferably, the bundle adapter is molded around the respective ends of the optical fibers in one piece. As a result, the assembly which includes the optical fibers and the bundle adapter or the assembly including the two bundle adapters can be particularly cost-effectively produced, and the optical fiber ends can be securely and tightly anchored in the respective bundle blocks. This also ensures that a certain overhang of the optical fiber ends in the region of the bundle adapter, which is required for accurate light introduction and illumination, is maintained.

According to another preferred embodiment of the invention, the end of the at least one, preferably however several or all optical fibers is arranged in a light well. This prevents stray light impinging on adjacent illuminated symbols or shift position designations, resulting in a better and sharper separation during selective illumination of individual illuminated symbols or shift position designations.

A skilled artisan will recognize that the invention is not limited to operating devices with pivotable operating levers of the type frequently used for operating gearboxes or automatic transmissions. According to a preferred embodiment of the invention, the operating element may therefore also be a rotary switch element or a rotary knob having several shift angle positions. The rotary switch element or rotary knob may here be arranged, for example together with the illuminatable shift position designations, in or on the console arrangement. A switch operation can thus be performed with the rotary switch or rotary knob element, wherein the shift position selected on the rotary switch or rotary knob element can be indicated again—as described above—with the ordered fiber-optic bundle direct in the console arrangement.

BRIEF DESCRIPTION OF THE DRAWINGS

The invention will now be described below in more detail with reference to drawings which merely illustrate exemplary embodiments. In the drawings:

FIG. 3 shows the shift gate of the operating device according to FIG. 1 and FIG. 2, as viewed against the direction of travel;

FIG. 4 shows schematically in an isometric view the fiber-optic bundle of the operating device according to FIGS. 1 to 3 with bundle adapters; and FIG. 5 shows in a schematic cross-sectional view a longitudinal cross section through the bundle adapter and the fiber-optic bundle according to FIGS. 3 and 4.

DETAILED DESCRIPTION OF THE INVENTION

Figure 1:
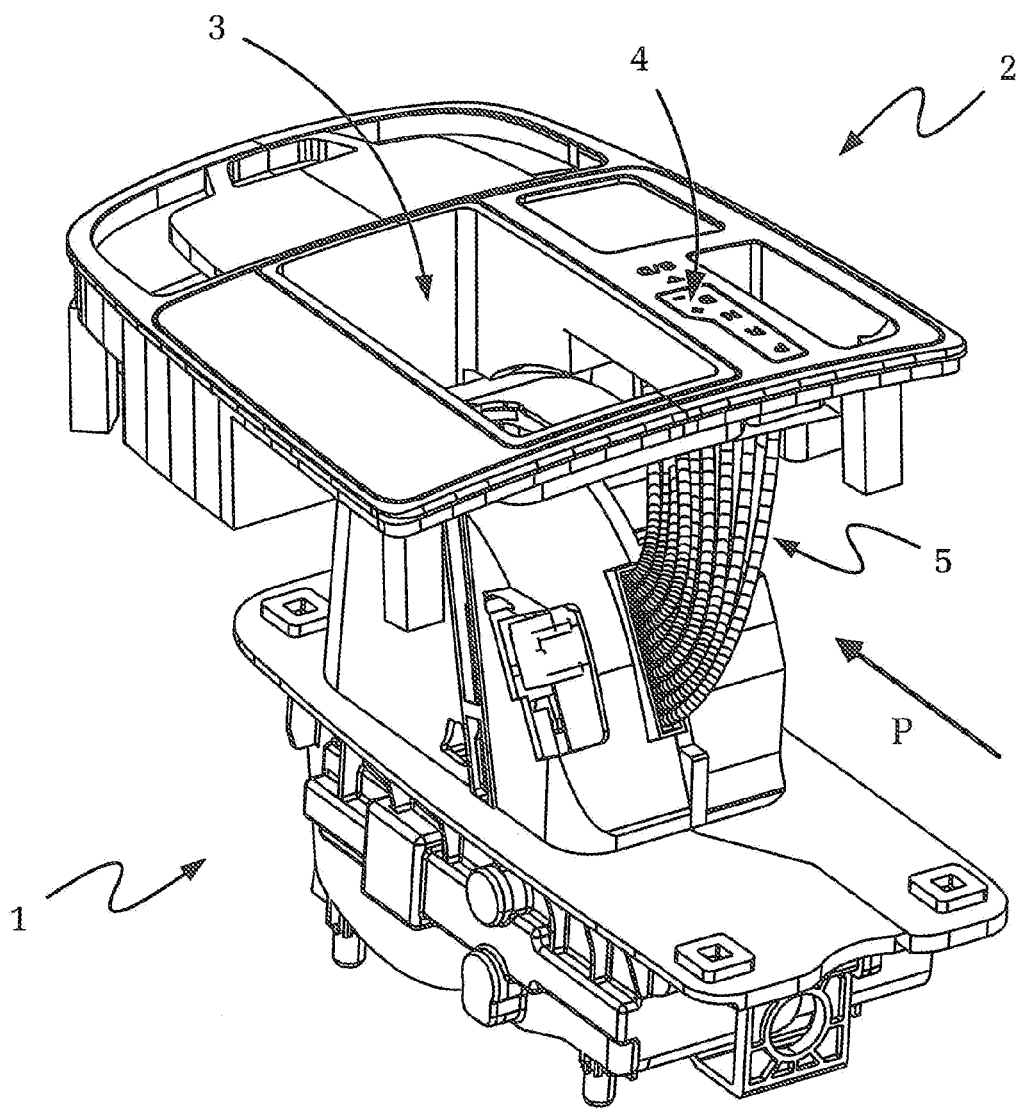
FIG. 1 shows in an isometric view an embodiment of an operating device with fiber optic bundle according to the present invention.

FIG. 1 shows an embodiment of an operating device according to the present invention in an isometric view. Clearly seen are a shift operating device 1 and a console arrangement 2 with a shift gate 3 configured as a separate assembly. The shift gate 3 is used for receiving an (unillustrated) selection lever and has a shift position indicator device 4 with a plurality of shift position designations for visualizing the engaged drive position.

As seen in FIG. 1, an ordered fiber-optic bundle 5 is arranged between the shift operating device 1 and the console arrangement 2. The fiber-optic bundle 5 connects an electronics unit disposed inside the housing of the shift operating device 1 and the associated light-emitting device with the shift position indicator device 4 located in the console arrangement 2.

This means that unlike in the state-of-the-art, no complex mechanical components nor an additional circuit board with control electronics or dedicated light sources in the console arrangement 2 are required for controlling and/or illuminating the individual shift position designations or illuminated symbols of the shift position indicator device 4. Instead, the circuit board with the control electronics and the light sources—together with control electronics of the operating device—can be housed as a unit in the shift operating device 1. This not only lowers manufacturing and assembly costs and eliminates error sources, but also enhances the overall reliability of the operating device.

The arrow P in FIG. 1 indicates the viewing direction according to the illustration in FIG. 3.

Figure 2:
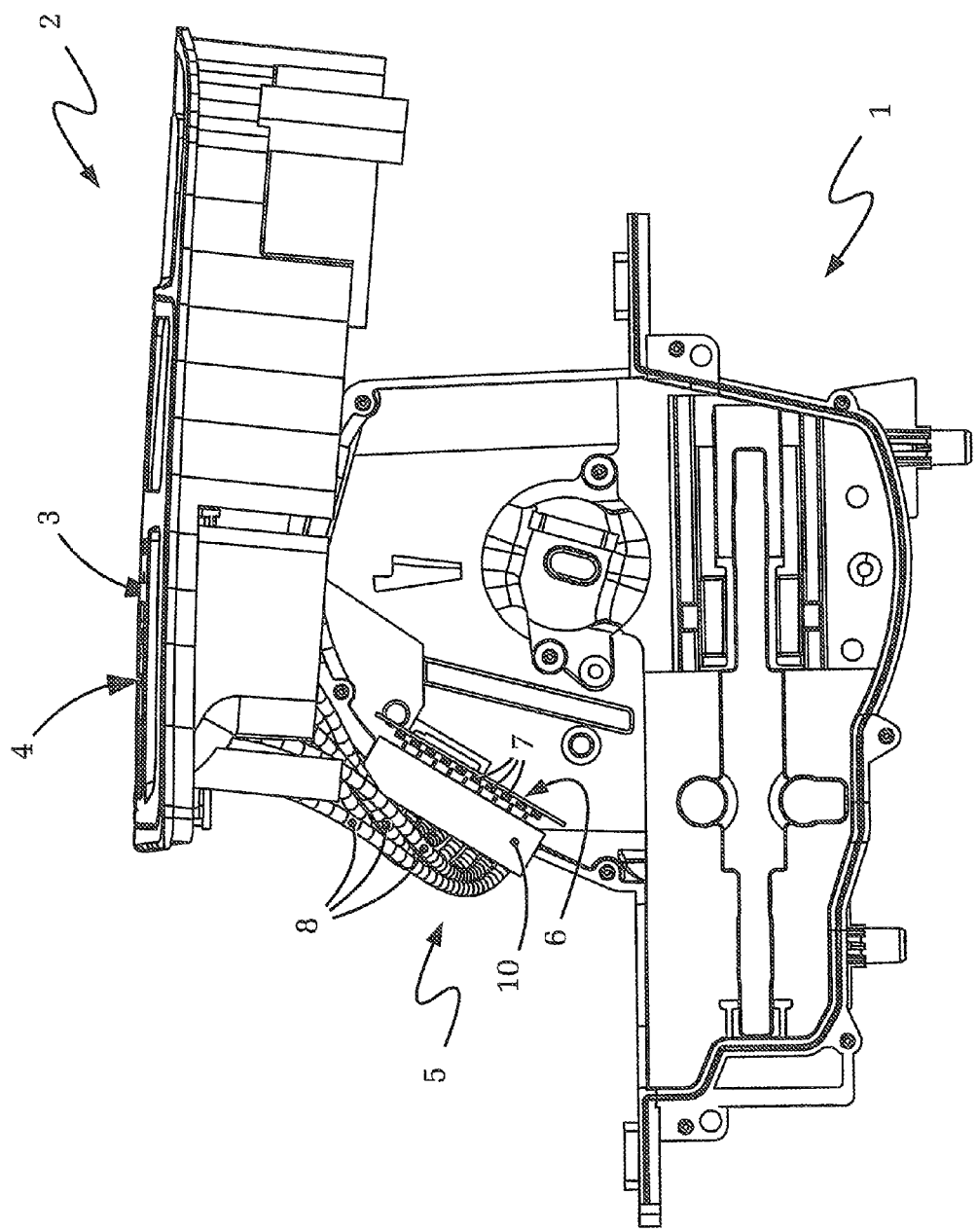
FIG. 2 shows the operating device according to FIG. 1 in a side view.

FIG. 2 shows the operating device according to FIG. 1 in a side view. Once more, the shift operating device 1 as well as the console arrangement 2, which is configured as a separate assembly, with the (covered) opening of the shift gate 3 for an (unillustrated) selection lever can be clearly identified. The partially open housing of the shift operating device 1 shows the circuit board or electronics unit 6 arranged in the shift operating device 1 with light sources or light-emitting diodes 7 arranged on the circuit board or electronics unit 6. An optical fiber 8 of the fiber-optic bundle 5 is associated with each of the light-emitting diodes 7, with the optical fiber 8 transmitting the light from the corresponding light-emitting diode 7 selectively to the shift position indicator device 4 positioned in the console arrangement 2. As can also be seen, due to the flexibility of the fiber-optic bundle 5 in this embodiment, the console arrangement 2 can be positioned and installed in different relative positions with respect to the shift operating device 1. With a corresponding control of the light sources implemented here as light-emitting diodes 7, for example a two-level control, the entire shift pattern of the shift position indicator device 4 can be illuminated with reduced brightness, while only the currently selected shift position is emphasized by illumination with higher intensity.

FIG. 3 shows again the console arrangement 2 and the fiber-optic bundle 5 as viewed against the direction of travel according to the arrow P in FIG. 1, and further indicates the intersecting plane A-A through the bundle adapter 9 according to FIG. 5.

FIG. 4 illustrates the fiber-optic bundle 5 as an assembly together with the two bundle adapters 9, 10. As can be seen, the fiber-optic bundle 5 represents a robust unit that can be easily handled and installed because the optical fiber ends are rigidly embedded in the bundle adapters 9, 10.

FIG. 5 shows a longitudinal section through the shift position indicator device 4 and bundle adapter 9 according to FIGS. 3 and 4 at all the intersecting plane A-A according to FIG. 3. One recognizes the optical fiber ends embedded into the body of the bundle adapter 9, with the ends of the optical fibers 8 fixedly secured in the bundle adapter 9. The ends of the optical fibers 8 which slightly protrude from the bundle adapter 9 ensure that the light correctly exits in the direction of the shift position designations to be illuminated or the illuminated symbols disposed in the surface of the transparent shift position indicator device 4. To ensure a sharp separation of the illumination of the corresponding illuminated symbols or shift position designations in the shift position indicator device 4, corresponding light wells 11, 12 are provided which prevent crosstalk or leakage between the light exits of the individual optical fibers 8. The ends of the two optical fibers disposed on the left side of the Figure here extend to a light well 12 which is common to both ends, because a symbol with a larger area must be illuminated at this location of the shift position indicator device 4. Alternatively, the end of the corresponding optical fiber can also be suitably widened, so that a symbol with a larger area can illuminated with only a single optical fiber.

In summary, it becomes apparent that with the invention an operating device with position indication is provided, in particular for a gear-changing transmission, which can result in particular cost savings in production and assembly. At the same time, a flexible, robust and reliable selective illumination of the illuminated symbols or shift position designations of the position indicator in the region of the shift gate can be attained. An additional, comparatively complex electronic module in the area of the shift gate and its electrical contact assembly can thus be eliminated.

The invention claimed is:

1. An operating device for selecting shift positions of a gear-changing transmission, the operating device comprising
a shift operating device and a console arrangement with a mechanical operating element extending through the console arrangement,
a shift position indicator device arranged in the console arrangement with illuminatable shift position designations,
wherein the shift operating device includes an electronics unit integrated with a plurality of light-emitting devices, wherein an ordered fiber-optic bundle formed of at least one elastic optical fiber is arranged between the light-emitting device and the shift position indicator device for selective illumination of shift position designations and wherein an end of at least one optical fiber is arranged in a light well of the shift position indicator device, a corresponding one of the plural light-emitting devices is optically associated with each of the elastic optical fibers and thus each illuminatable shift position designation.

2. The operating device according to claim 1, wherein the fiber-optic bundle is formed of macroscopic plastic optical fibers.

3. The operating device according to claim 1, wherein the ends of the optical fibers are each received in a common bundle adapter.

4. The operating device according to claim 3, wherein the bundle adapter is molded around the ends of the optical fibers.

5. The operating device according to claim 4, wherein the ends of the optical fibers protrude from the bundle adapter to insure that light correctly exits in a direction of the illuminatable shift position designations.

6. The operating device according to claim 1, wherein the operating element is a rotary switch element or rotary knob.

7. The operating device according to claim 1, wherein the transmission is an automatic transmission.

8. The operating device according to claim 1, wherein the fiber-optic bundle is formed of a single elastic optical fiber for each of the illuminatable shift position designations.

* * * * *